Patented June 10, 1930

1,762,228

UNITED STATES PATENT OFFICE

HARRY N. HOLMES, OF OBERLIN, OHIO

PREPARATION OF ADSORPTIVE GELS

No Drawing.   Application filed September 12, 1925. Serial No. 56,077.

This invention relates to the preparation of adsorptive inorganic gels in a manner to very materially increase the porosity and consequently the adsorptive ability. While relating to all kinds of adsorptive inorganic gels, to wit, silica gels, stannic oxide gels, ferric oxide gels, alumina gels, etc.; it will be described for purposes of illustration more particularly in its relation to silica gels.

The invention relates more particularly to the moist heat treatment of gels still containing more than 35 per cent water, combined with a sweating of such treated gels in closed vessels, so as to reduce or prevent shrinkage of the mass as a whole on drying, to secure a consequent reduction in density of the gel lumps. This density reduction is due to two classes of pores, to wit, ultra-microscopic pores obtained by removal of water and a second type of larger pore obtained by the removal of dissolved material.

Certain gelatinous precipitates, such as silicic acid, hydrated ferric oxide and others, when washed and dried by well known methods, produce porous solids, of which the so-called silica gels are of commercial value due to their marked ability to adsorb gases and vapors from mixtures with air and even other materials, such as coloring matter, from solutions of colloidal dispersions in liquids. These adsorbed gases, vapors or materials are readily recovered from the gels by moderate heating. The high adsorptive capacity is due to ultra-microscopic or near ultra-miscroscopic capillaries or pores, left by the removal of water or other materials in the washing and drying process. While this water or other material is being removed, it is clear that the less the shrinkage of the solid or semi-solid mass, the greater is the total volume of the open spaces or capillaries in the final product. There is usually considerable shrinkage of the gel material on drying.

Silica gel has commonly been prepared (see Patrick Patent No. 1,297,724) by mixing a water glass solution with dilute sulphuric or hydrochloric acid, allowing the mixture to stand until it sets as a gel, breaking the gel into lumps, washing them free from excess acid and soluble salts and drying slowly, raising the temperature to 120° C. or even higher. The product is in the form of hard glassy lumps with capillaries invisible even under the best microscopes, but demonstrating their presence by the adsorptive capacity.

As described in the Patrick patent, the solutions of water glass and acid reacts somewhat more rapidly if heated to about 50° C. and even as high as 80° C. before mixing, the purpose being to speed the setting of the gel, no other reason being mentioned.

I have discovered that if soft gels made from the treatment of water glass solution with acid are heated, preferably for two or three hours (although shorter heating is beneficial), before drying, or at least before drying so as to reduce the water content below approximately 50 to 60 per cent, to temperatures ranging from 80° C. to 150° C., or even higher, if possible in practice, while the gel is in the presence of water in some form and additional to that contained within the gel, such as by being immersed in water or some water solution or even exposed to direct contact with steam, the gel structure becomes so hardened or set with such physical characteristics that during the subsequent drying any shrinkage or contraction of the mass as a whole is far less than when this special moist heat treatment is omitted. As a consequence the density of the final gel, when washed and dried is lower, the gel is lighter, and it contains a greater useful pore volume available for adsorptive purposes. Instead of the clear glassy appearance described by Patrick for his gel, my product is somewhat chalky in appearance to the naked eye.

As a fair example of my improved moist heat treatment a specific example will be given of a method of preparing special silica gel from the red-brown gel formed by precipitation of water glass solutions by solutions of ferric salts, such as ferric chloride or sulphate solutions.

500 cubic centimeters of water white sodium silicate or water glass, with a density of about 1.37 and a ratio $Na_2O$ to $SiO_2$ of about 1 to 3.5, is diluted to a volume of 10 liters by the addition of 9500 cubic centimeters of water. To this, with vigorous stirring, are added 1600 cubic centimeters of twice normal ferric chloride solution, although the proper proportion of ferric sulphate may be used. The mixture is allowed to stand about sixty hours and the precipitate, after filtering, is dried on racks in a moderately warm room for a week or two.

When the water content of the drying precipitate has dropped to 85 to 90 per cent the mass is broken into lumps, averaging in size about one inch on the edge, to facilitate drying in a more uniform manner. When the water content has further dropped to 60 to 65 per cent the lumps of gel are transferred to air-tight containers, where they are allowed to stand until synæresis produces a "sweat" or coating of drops of water or water solution upon the surface of the lumps.

At this stage the gel consists of somewhat hydrated iron oxide, somewhat hydrated silicon dioxide, sodium chloride and water. The iron oxide is now removed by the process described in a prior patent by myself and John A. Anderson, No. 1,665,264, granted April 10, 1928, for silica gels and the process of making the same, to which reference may be had for a clearer description, if necessary. However, instead of dissolving out the iron oxide with cold acid, such as hydrochloric or sulphuric, the acid solution treatment is combined in one operation with the moist heat treatment before referred to.

The red-brown lumps of gel, with the water content now reduced to about 60 per cent (although any water content below 70 per cent and above 35 per cent is advantageous) are boiled gently in nine normal (9N) sulphuric acid solution for at least one hour after the red-brown color has disappeared from the center of the lumps. Such boiling, with acid of this strength, requires about 113° C. Changing the acid a few times is frequently of advantage. The gel is now washed with hot water nearly free from excess acids and salts, such as ferric sulphate and sodium chloride. After drying with a slow rise in temperature to 120° C. or even higher, if desired, the gel is activated by heating to nearly 200° C. for one hour in a slow stream of dry air, and is ready for use as an adsorber.

Hydrochloric acid may be used instead of sulphuric acid to remove the iron oxide, but excessive loss of acid dictates the use of a recovering condenser. Nine normal (9N) sulphuric acid solution boiled at about 113° C. does not suffer such loss, and by using stronger acid solutions the boiling point may be raised, but apparently with no special advantage.

Gels containing even above 70 per cent of water content may also receive this beneficial moist heat treatment by heating in water at from 80° C. to 100° C. or by boiling in water solutions at temperatures above 100° C. Direct contact with steam will also produce beneficial results.

The beneficial results appear to be due to the fact that ordinary oven drying drives off the water content of the gel before its physical structure is set firmly enough to prevent excessive contraction on further or subsequent drying, whereas the heat treatment to temperatures from 80° C. to over 100° C. in the presence of additional water, either by immersion in water or in a water solution or by being brought into direct contact with steam, enables the gel to reach a fixed physical condition and acquire sufficient strength so that subsequent drying does not cause great contraction or material loss of porosity.

In practice I have found an increased gain in porosity and added strength of the gel lumps result from allowing the gels with a water content of less than 70 per cent (but preferably from 60 to 65 per cent) to stand in a closed vessel until synærized or "sweat" drops of water or water solution cover the outer surfaces of the lumps. In the open air the evaporation of water is too rapid for the gradual development of physical structure required at this stage. It is usually best to have the moist heat treatment follow rather than precede the "sweating" treatment.

While I have referred to boiling the red-brown lumps of gel in nine normal (9N) sulphuric acid solution, thereby combining in one step both the moist heat treatment and the solution of the iron, it is obvious that the two effects may be produced separately. For example, the red-brown lumps of gel might first be boiled in water for the moist heat treatment and the iron be later removed by treatment with an acid solution.

The method described produces a silica gel with a very large increase in or more accurately, retention of, the volume by the effective ultra-microscopic pores, to wit, pores obtained by removal of water and ranging from 4 to 10 millimicrons in size, as well as a larger volume of the larger pores of the type obtained by removal of ferric or other metallic oxide, which latter pores may reach a size just visible with the strongest microscopes.

What I claim is:

1. The process of preparing silica gels with high adsorptive capacity, comprising treating a soluble silicate in solution with an acid and collecting the gel thus formed, heating the gel at a temperature above 80° C. in the presence of water for a sufficient period to set the structure without undue shrinkage, and washing and drying the product.

2. The process of preparing silica gels with high adsorptive capacity, comprising treating a soluble silicate in solution with an acid, collecting the gel thus formed, reducing the water content of the gel to less than 70 but more than 35 per cent, treating the partially dried product at a temperature above 80° C. in the presence of water to set the physical structure, and washing out soluble material.

3. The process of preparing an inorganic gel, comprising mixing a water solution of a soluble salt of an acid, whose anhydride can be heavily hydrated and is insoluble, with a water solution of a readily hydrolyzable salt of a metal to form a gel of intimately mixed insoluble metallic oxide and an insoluble heavily hydrated acidic anhydride, collecting the gel thus formed, and subjecting it to the effect of water at a temperature above 80° C. to set the physical structure.

4. The process of preparing an inorganic gel, comprising mixing a water solution of a soluble salt of an acid whose anhydride can be heavily hydrated and is insoluble, with a water solution of a readily hydrolyzable salt of a metal to form a gel of intimately mixed insoluble metallic oxide and an insoluble heavily hydrated acidic anhydride, collecting the gel thus formed, subjecting it to the effect of water at a temperature above 80° C. to set the physical structure, and removing the metallic oxide by digesting the material with a dissolving reagent and subsequently washing out the soluble compound.

5. The method of producing inorganic gels with high adsorptive capacity, comprising mixing a water solution of a soluble salt of an acid, whose anhydride can be heavily hydrated and is insoluble, with a water solution of a readily hydrolyzable salt of a metal to form a gel of intimately mixed insoluble metallic oxide and insoluble heavily hydrated acidic anhydride, collecting the gel thus formed, allowing the same to dry slowly to reduce its water content to between 70 and 35 per cent, and subjecting the partially dried product to a temperature above 80° C. in the presence of water to set the physical structure.

6. The method of producing inorganic gels with high adsorptive capacity, comprising mixing a water solution of a soluble salt of an acid, whose anhydride can be heavily hydrated and is insoluble, with a water solution of a readily hydrolyzable salt of a metal to form a gel of intimately mixed insoluble metallic oxide and insoluble heavily hydrated acidic anhydride, collecting the gel thus formed, allowing the same to dry slowly to reduce its water content to between 70 and 35 per cent, subjecting the partially dried product to a temperature above 80° C. in the presence of water to set the physical structure, converting the insoluble metallic oxide to soluble form by digesting with a dissolving reagent, washing out the solution thereof, and further drying the material to final form.

7. The process of heating any inorganic gel containing more than 35 per cent water to a temperature above 80° C. in the presence of additional water which has been deliberately brought into contact with the gel, for the purpose of setting the physical structure, so that shrinkage on further drying will be less than if the moist heat treatment were omitted.

8. The method of treating moist inorganic gels to increase adsorptive capacity, comprising drying the gel to reduce its water content to less than 70 but more than 35 per cent, aging the gel by allowing it to stand in a closed vessel, and then subjecting the partially dried gel to a temperature above 80° C. in the presence of additional water which has been deliberately brought into contact with the gel, for the purpose of setting the physical structure so as to prevent undue shrinkage on further drying.

9. The method of treating moist inorganic gels to increase adsorptive capacity, comprising drying the gel to reduce its water content to less than 70 but more than 35 per cent, allowing the gel to stand in a closed vessel until a "sweat" of drops of water or water solution appears on the gel surface, and then subjecting the partially dried gel to a temperature above 80° C. in the presence of water to set the physical structure so as to prevent undue shrinkage on further drying.

In testimony whereof I hereby affix my signature.

HARRY N. HOLMES.